(12) United States Patent
Sengupta et al.

(10) Patent No.: US 11,675,584 B1
(45) Date of Patent: Jun. 13, 2023

(54) VISUALIZING DEPENDENT RELATIONSHIPS IN COMPUTER PROGRAM ANALYSIS TRACE ELEMENTS

(71) Applicant: Amazon Technologies, Inc., Seattle, WA (US)

(72) Inventors: Aritra Sengupta, Mountain View, CA (US); Lee Pike, Portland, OR (US); Martin Schaef, Queens, NY (US); Nicolas Leandro Rosner, New York, NY (US); Willem Conradie Visser, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 17/217,327

(22) Filed: Mar. 30, 2021

(51) Int. Cl.
*G06F 9/44* (2018.01)
*G06F 8/75* (2018.01)
*G06F 16/901* (2019.01)
*G06F 8/10* (2018.01)

(52) U.S. Cl.
CPC .................. *G06F 8/75* (2013.01); *G06F 8/10* (2013.01); *G06F 16/9027* (2019.01)

(58) Field of Classification Search
CPC ........... G06F 8/10; G06F 8/75; G06F 16/9027
USPC ................................................. 717/124–133
See application file for complete search history.

(56) References Cited

U.S. PATENT DOCUMENTS

| | | | | |
|---|---|---|---|---|
| 7,975,262 | B2* | 7/2011 | Cozmei | G06F 11/3636 717/128 |
| 9,529,694 | B2* | 12/2016 | Srivastava | G06F 11/3636 |
| 10,379,849 | B1* | 8/2019 | Jasinski | G06F 11/3636 |
| 11,036,866 | B2* | 6/2021 | Iyer | G06F 16/9024 |
| 11,089,000 | B1* | 8/2021 | Muthusamy | G06F 21/6245 |
| 11,269,876 | B1* | 3/2022 | Basavaiah | G06F 8/77 |
| 2016/0330219 | A1* | 11/2016 | Hasan | H04L 63/1408 |

OTHER PUBLICATIONS

Javasoft, "Static Code Analysis", 2018, retrieved from https://docs.parasoft.com/display/CPPDESKV1040/, 26 pages. (Year: 2018).*

(Continued)

*Primary Examiner* — Ted T. Vo
(74) *Attorney, Agent, or Firm* — Nicholson De Vos Webster & Elliott LLP

(57) ABSTRACT

Techniques for visualizing dependent relationships in computer program analysis trace elements are described. A code analysis service analyzes computer code associated with a software application for at least one of errors or policy violations. The service outputs a trace log identifying a path within the computer code that results in an error or policy violation. The trace log includes a set of trace elements each corresponding to a line of the computer code. The output is displayed as a tree data structure including nodes. The nodes may include indentations indicating dependent relationships between and among variables initialized at lines in the computer code corresponding to the nodes. Alternatively, the nodes may be arranged as a hierarchy with edges connecting adjacent nodes, and nodes at different levels indicating dependent relationships. The tree data structure may include annotations providing additional contextual information about the actions performed at each node.

20 Claims, 10 Drawing Sheets

(56) References Cited

OTHER PUBLICATIONS

IBM, "IBM Tivoli Storage Productivity Center Version 5.1.1—Problem Determination Guide", 2012, IBM Incorporation, 115 pages. (Year: 2012).*

Farnhill, B, "Tightening application security with Amazon CodeGuru," AWS DevOps Blog, Dec. 1, 2020, retrieved at https://aws.amazon.com/blogs/devops/tightening-application-security-with-amazon-codeguru/, 8 pages.

* cited by examiner

- Class1.java: line 5 (z of type int is initialized) ◄— 224
    ▼— 204
  - Class1.java: line 3 (x of type int is initialized and length() called on a) ◄— 226
      ▼— 206
    - Class1.java: line 2 (a of type string is initialized) ◄— 228
        ▼— 208
      - Class2.java: line 8 (constant "x86" of type string is defined) ◄— 230
          ▼— 210
  - Class1.java: line 4 (y of type int is initialized with value -4) ◄— 232
      ▼— 212
- Class1.java: line 6 (potential assertion violation with value of z as -1) ◄— 234
    ▼— 214

VISUALIZING DEPENDENT RELATIONSHIPS IN COMPUTER PROGRAM ANALYSIS TRACE ELEMENTS

BACKGROUND

A software bug is an error, flaw, or fault in computer code that causes it to produce an incorrect or unexpected result, or to behave in unintended ways. Software bug detection tools, such as static and dynamic program analysis tools, are used to find software bugs. Static program analysis is the analysis of a computer program that is performed without actually executing the program, while dynamic analysis is analysis performed on a computer program while it is executing. Typically, the analysis is performed on some version of the source code or some form of the object code.

BRIEF DESCRIPTION OF DRAWINGS

Various embodiments in accordance with the present disclosure will be described with reference to the drawings, in which:

FIG. 2 is a diagram illustrating output of a computer program analysis trace tool displayed as a tree data structure with annotations according to some embodiments.

DETAILED DESCRIPTION

Figure 1:
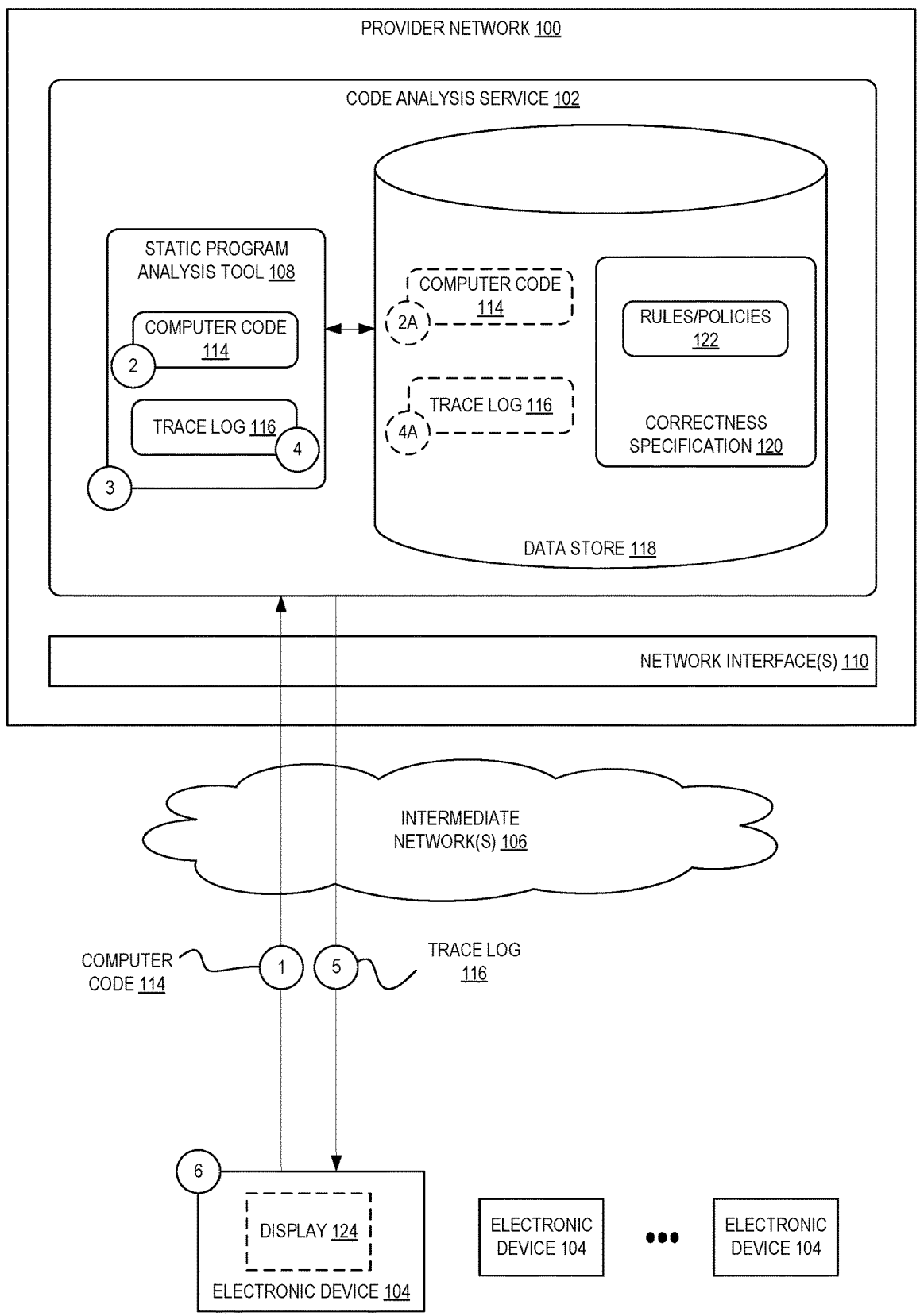
FIG. 1 is a diagram illustrating an environment for computer program analysis according to some embodiments.

The present disclosure relates to visualizing dependent relationships in computer program analysis trace elements. According to some embodiments, a computer program analysis trace tool is used to analyze computer code, and the output of the tool is displayed as a tree data structure, rather than as a linear trace. One form of the tree data structure uses line indentations to illustrate dependent relationships between nodes of the tree data structure, where the nodes correspond to locations (e.g., lines) in the computer code. In some embodiments, the computer program analysis trace tool outputs annotations for one or more of the nodes of the tree data structure, where the annotations provide contextual information that helps the user understand the action(s) performed at the locations in the computer code corresponding to the annotated nodes, as well as usage of data types from other parts of the computer code and operations performed on data types. In still further embodiments, the tree data structure uses color coding to distinguish nodes at different levels, which further aids the user's understanding of the dependent relationships between and among nodes in the tree data structure.

A software bug is an error, flaw, or fault in computer code that causes it to produce an incorrect or unexpected result, or to behave in unintended ways. Software bug detection tools, such as static and dynamic program analysis tools, are used to find software bugs. According to prior techniques, the output of such a detection tool is presented to the user by pointing to a specific line of code where an error is found, or as a trace showing a sequence of program statements that results in an error. A trace is the output of a tracing process, and a form of the trace is displayed for a user to view. Performing a tracing process involves receiving, at a computer program analysis tool, input of a program (also referred to as computer code), following possible paths through the program, collecting information about what is happening in the program, producing an output, and displaying a form of the output. Tracing may, for example, involve a specialized use of logging to record information about the program's execution. In simple cases, tracing is just a few print statements, which output the values of variables at certain points of program execution.

A technical problem with traces produced according to prior techniques is user understandability. For example, a trace produced and displayed according to prior techniques might contain information about just a single line of code, or a group of lines of code, where a program error occurs. The trace, however, may omit relevant information pertaining to one or more other parts of the program, such as locations where variables and/or constants are initialized. In another example, a trace may present statements in an unintuitive order, such as in an order that doesn't correspond to the order in which the program executes.

As an example, consider the following simple code snippet (hereinafter Code Snippet A):

```
//Class2.java
getA( ){
line 8: return "x86";
}
//Class1.java
line 2: String a=getA( )//returns string constant "x86"
line 3: int x=a.length( )
line 4: int y=-4
line 5: z=x+y
line 6: assert (z>=0)
```

In this simple example, a program type is initialized, operations are performed on the program type, and the associated variable flows into operations performed on other program types, e.g., used in another program type. For example, a variable "a" is initialized with string constant "x86," and the length of the variable "a" is used to initialize a variable "x." In this program, there is a path where the assertion at line 6 is violated. In particular, there is a path where z=−1, because z=x+y, where x=3 (the length of the variable "a") and y=−4. This path, which may be referred to as a bug, is a potential program behavior that does not meet the program specification.

Program analysis tools check the program against a correctness specification. In the example above, the correctness specification is the assertion statement at line 6 that checks that, along any program path, z should be greater than or equal to 0. When a program analysis tool finds a potential violation, the output of the tool is sometimes presented to the user (e.g., displayed on a display) in the form of a linear trace. For example, consider the following linear trace output from a computer program analysis tool based on Code Snippet A:

1. Class1.java: line 5
2. Class1.java: line 3
3. Class1.java: line 2
4. Class2.java: line 8
5. Class1.java: line 4
6. Class1.java: line 6

The program analysis tool outputs the above trace because of the order in which it discovers the bug. In particular, the tool analyzes the statement at line 5 (z=x+y), and based on the variables used in that line, it issues a backward query that analyzes (recursively) the statement at line 3 (int x=a.length( )), then the statement at line 2 (String a=getA( )), then the statement at line 8 in Class2.java (return "x86"), then the statement at line 4 (int y=−4), then the statement at line 6 (assert (z>=0)). The above trace illustrates the technical problems with prior program analysis tools. In particular, traces produced using prior program analysis tools may be unintuitive for multiple reasons. For example, the information displayed by the trace is quite limited, because it is nothing more than an ordered list of program types and program line numbers. No contextual information is provided to aid the user's understanding of how the sequence of program line numbers leads to an error. The above trace is relatively short, because it's based on the relatively simple Code Snippet A, but in typical use cases a sequence of statements in a trace may include dozens of program line numbers that span multiple files, which makes such traces much more difficult to understand than the simple example provided above. Further, a trace produced using prior program analysis tools may have interleaved within it data flows from program types defined and used in other parts of the program. And, recursively, these program types may have other data flows interleaved within them. This interleaving of data flows makes the trace even more difficult to follow, particularly considering that no contextual information is provided to aid the user's understanding. In another example, a trace might not follow the same order as that in which the program executes. Further, a set of traces might be related, but the output from the prior program analysis tool does not provide any indication of such relationship, let alone any indication of how the traces are related.

The present embodiments provide technical solutions to these technical problems by capturing dependent relationships between trace elements, and augmenting the trace with contextual information about those relationships. In some embodiments, the contextual information provided in the trace comprises displaying the trace as a tree data structure in which nodes are indented to indicate dependent relationships between and among variables and/or constants defined within the computer code. For example, a first node of the tree data structure may correspond to a location in the computer code at which a first variable is initialized, and a second node of the tree data structure may correspond to a location in the computer code at which a second variable is initialized. If the value of the first variable depends on the value of the second variable, then the tree data structure is presented with the second node (may be referred to as a child node) positioned beneath the first node (may be referred to as a parent node) and the second node indented with respect to the first node. If the value of the second variable depends on a value of a third variable, then the tree data structure is presented with the third node positioned beneath the second node and the third node indented with respect to the second node. This pattern of nested indentations is repeated for however many dependent relationships exist for any number of variables (and/or constants), with each successive node being indented with respect to the node above it in the tree data structure, and a child node signifies that its parent node uses the value defined at the location in the computer code corresponding to the child node. The pattern of indentations thus provides a visual illustration for the user to easily understand the dependent relationships between and among variables and/or constants defined within the computer code, which in turn aids the user's understanding of how and where the error occurs in the computer code.

Also in some embodiments, the tree data structure includes annotations in the displayed form of the output (the trace) that provide further contextual information to enhance understandability. For example, a first annotation corresponding to a first node may indicate that a first variable (or constant) is initialized at a first location in the computer code. The first annotation may further indicate a type of the first variable (or constant), such as an integer variable or a string constant. The annotations thus provide contextual information that aids the user's ability to understand the actions performed at the corresponding locations in the computer code.

Also in some embodiments, the tree data structure includes color coding in the displayed form of the output (the trace) to enhance understandability. For example, a first node may be represented in the trace using a first color, and a second node, which is a child of the first node (or parent node), may be represented in the trace using a second color that is different from the first color. The colors in the tree data structure may be in the form of colored text, or colored highlighting overlying text, or colored bullet points setting off the nodes, or in any other representation that uses different colors to indicate dependent relationships between and among nodes. In some embodiments, nodes at the same level (e.g., having the same amount or degree of indentation) may be represented with the same color.

FIG. 1 is a diagram illustrating an environment for computer program analysis according to some embodiments. The illustrated environment includes a provider network 100 hosting a code analysis service 102. One or more electronic devices 104 (may also be referred to as user devices) interact with the provider network 100 across one or more intermediate networks 106 (e.g., the internet). The electronic devices 104 access a computer program analysis tool 108 (e.g., software) executed by the code analysis service 102 hosted by the provider network 100.

A provider network (may also be referred to as a cloud provider network) provides users with the ability to use one or more of a variety of types of computing-related resources, such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or customers) of provider networks may use one or more user accounts that are associated with a customer account, though these terms may be used somewhat interchangeably depending upon the context of use. Users may interact with a provider network across one or more intermediate networks (e.g., the internet) via one or more network interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from, or cause actions within, the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network that includes backend services supporting and enabling the services that may be more directly offered to customers.

For example, a cloud provider network (or, simply, cloud) typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network), and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks often rely upon virtualization techniques. For example, virtualization technologies may provide users the ability to control or use compute resources (e.g., a compute instance such as a VM using a guest operating system (O/S) that operates using a hypervisor that may or may not further operate on top of an underlying host O/S, a container that may or may not operate in a VM, a compute instance that can execute on bare metal hardware without an underlying hypervisor), where one or multiple compute resources can be implemented using a single electronic device. Thus, a user may directly use a compute resource (e.g., provided by a hardware virtualization service) hosted by the provider network to perform a variety of computing tasks. Additionally, or alternatively, a user may indirectly use a compute resource by submitting code to be executed by the provider network (e.g., via an on-demand code execution service), which in turn uses one or more compute resources to execute the code—typically without the user having any control of or knowledge of the underlying compute instance(s) involved.

For example, in various embodiments, a serverless function may include code provided by a user or other entity—such as the provider network itself—that can be executed on demand. Serverless functions may be maintained within provider network by an on-demand code execution service and may be associated with a particular user or account, or may be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network. In some embodiments, these resources may be maintained in a ready state (e.g., having a pre-initialized runtime environment configured to execute the serverless functions), allowing the serverless functions to be executed in near real-time.

In the embodiment illustrated in FIG. 1, the computer program analysis tool 108 is software executed by one or more processors (not shown) of the code analysis service 102, which is implemented as a service (e.g., an on-demand code execution service) in the provider network 100, and the computer program analysis tool 108 is accessible to user(s) operating the electronic device(s) 104 over the intermediate network(s) 106. A user may thus submit, using the electronic device 104 and via the intermediate network(s) 106, computer code 114 (e.g., source code) to be analyzed by the computer program analysis tool 108. The user may subsequently receive, at the electronic device 104 and again via the intermediate network(s) 106, output (e.g., a trace log 116) of the computer program analysis. In other embodiments, however, the computer program analysis tool 108 may be implemented as software executed directly by the electronic device 104. For example, the computer program analysis tool 108 may be embodied as software stored within memory of the electronic device 104 and executed by one or more processors of the electronic device 104.

With continued reference to FIG. 1, at circle "1" computer code 114 to be analyzed by the computer program analysis tool 108 is transmitted from the electronic device 104 to the code analysis service 102 over the intermediate network(s) 106 and via one or more network interfaces 110 of the provider network 100. Computer code (may also be referred to as a computer program) is a collection of instructions that can be executed by a computer to perform a specific task. Computer code is usually written by a human programmer in a human-readable programming language. From the program in its human-readable form of source code, a compiler or assembler can derive machine code, which is a form having instructions that the computer can directly execute. As used herein, the term computer code encompasses all forms of code, including but not limited to source code, object code, machine code, and executable code. The computer code transmitted from the electronic device 104 to the code analysis service 102 may be, for example, source code associated with a software application. In some embodiments, when the computer code from the electronic device 104 reaches the code analysis service 102, it may be stored in the data store 118 in encrypted form.

The electronic device 104 also transmits to the code analysis service 102 a request (e.g., a command, data, information, etc.) for the computer code 114 to be analyzed for at least one of errors or policy violations. The request may be transmitted together with the computer code 114 at circle "1," or in alternative embodiments the request may be transmitted before or after the computer code 114. Subsequent to receiving the computer code 114 and the request for the computer code 114 to be analyzed, the code analysis service 102 executes, at circle "2," the computer program analysis tool 108 to analyze the computer code 114. Static program analysis is the analysis of computer software that is performed without actually executing programs, in contrast with dynamic analysis, which is analysis performed on programs while they are executing. The analysis may be performed on some version of the source code, or on some form of the object code. In various embodiments, the computer program analysis tool 108 may perform either or both of static and dynamic analysis of computer programs.

In some embodiments, the computer program analysis tool 108 analyzes the computer code 114 by receiving the computer code 114 as input, and tracing the program line-by-line, following at least a subset of the possible paths through the program and checking for errors. An error in a computer program is a difference between the desired performance or behavior, and the actual performance or behavior, of the computer program. For example, the computer program analysis tool 108 may perform data analysis on the computer program, making sure defined data is properly used. As described further below, defined data may be improperly used, for example, when a defined variable leads to an invalid assertion. In another example, the computer program analysis tool 108 may check the computer program against defined coding rules from standards and/or against custom predefined rules or policies. When the computer program analysis tool 108 finds an error or a policy violation, it produces output (e.g., a trace log 116) including identifying information for the location(s) (e.g., line(s)) where the error or policy violation occurs. As used herein, inputs may be signals, information, data, commands, and the like received by a component, module, device, system, and the like, and outputs may be signals, information, data, commands, and the like sent from a component, module, device, system, and the like. The output of the computer program analysis tool 108 is subsequently transmitted to the electronic device 104, which may display some form of the output for review by the user. In alternative embodiments, the tracing may not be performed line-by-line, but rather may follow one or more tracing paths through the program (e.g., using backward and/or forward queries from points in the program of particular interest, such as assertion lines).

As an example, consider again Code Snippet A:
//Class2.java
getA( ) {
line 8: return "x86";
}
//Class1.java
line 2: String a=getA( ) //returns string constant "x86"
line 3: int x=a.length( )
line 4: int y=−4
line 5: z=x+y
line 6: assert (z>=0)

The above computer code 114 is transmitted to the code analysis service 102 at circle "1." At circle "2," the computer program analysis tool 108 receives the computer code 114 as input, and, at circle "3," the computer program analysis tool 108 analyzes the computer code 114 by tracing the program, following one or more possible paths through the program, checking for errors and/or policy violations, and generating output stored in the trace log 116, at circle "4". In some embodiments, the computer code 114 may be stored at a data store 118 of the code analysis service 102 at circle "2A." The computer code 114 stored at the data store 118 may be encrypted in some embodiments. Also in some embodiments, the trace log 116 may be stored at the data store 118 at circle "4A."

In the example Code Snippet A, the computer program analysis tool 108 identifies a first path that leads to an invalid assertion at line 6. In particular, in Class2.java, at line 8, a constant "x86" of type string is defined. In computer programming, a constant is a value that cannot be altered by the program during normal execution, as contrasted with a variable, which is an identifier with a value that can be changed during normal execution.

Continuing to trace the program line-by-line, the computer program analysis tool 108 identifies, in Class1.java, at line 2, a variable "a" of type string is initialized with string constant "x86." In computer programming, a variable is a storage location (identified by a memory address) paired with an associated symbolic name, which contains some known or unknown quantity of information referred to as a value. The variable name is the usual way to reference the stored value, in addition to referring to the variable itself, depending on the context. This separation of name and content allows the name to be used independently of the exact information it represents. The identifier in computer source code can be bound to a value during run time, and the value of the variable may thus change during program execution.

Continuing to trace the program line-by-line, the computer program analysis tool 108 identifies, in Class1.java, at line 3, a variable "x" of type int is initialized with the length of the variable "a." Then, at line 4, a variable "y" of type int is initialized with value −4. Then, at line 5, a variable "z" of type int is initialized with value "x+y." Then, at line 6, a value of the variable "z" is asserted. In particular, line 6 of Class1.java asserts z>=0.

In this program, there is a path where the assertion at line 6 of Class1.java is violated. In particular, there is a path where z=−1, because z=x+y, where x=3 (the length of the variable "a") and y=−4. This path, which may be referred to as a bug or an error, is a potential program behavior that does not meet the program specification. To identify this error, the computer program analysis tool 108 analyzes the statement at line 5 (z=x+y), and based on the variables used in that line, the computer program analysis tool 108 issues a backward query that analyzes (recursively) the statement at line 3 (int x=a.length( )), then the statement at line 2 (String a=getA( )), then the statement at line 8 in Class2.java (return "x86"), then the statement at line 4 (int y=−4), then the statement at line 6 (assert (z>=0)).

The computer program analysis tool 108 generates output that is stored in the trace log 116. The trace log 116 may be stored in local memory (not shown) accessible to the computer program analysis tool 108 and/or written to the data store 118 of the code analysis service 102. The trace log 116 includes trace elements, each corresponding to a location (e.g., a line) in the source code, and at least a subset of the trace elements together describe the path in the above program that results in the error.

The computer program analysis tool 108 generates further output representative of (e.g., is a binary representation of) a tree data structure, an example of which is illustrated in FIG. 2. The tree data structure 202 shown in FIG. 2 is a visual representation of the output of the computer program analysis tool 108, and illustrates how the tree data structure 202 may appear when displayed on a display 124 of the electronic device 104. The tree data structure 202 includes nodes, each representing one of the trace elements. For example, in the embodiment illustrated in FIG. 2, a first node 204 represents the trace element corresponding to Class1.java: line 5, a second node 206 represents the trace element corresponding to Class1.java: line 3, a third node 208 represents the trace element corresponding to Class1.java: line 2, a fourth node 210 represents the trace element corresponding to Class2.java: line 8, a fifth node 212 represents the trace element corresponding to Class1.java: line 4, and a sixth node 214 represents the trace element corresponding to Class1.java: line 6.

In the tree data structure 202, the nodes are arranged as a list, with each node positioned above and/or below the other nodes. The left end of each node may include a dash, as shown, or a bullet, or any other graphical symbol or notation (e.g., numbering or lettering) to demarcate the beginning of a node. Further, each node may be indented with respect to one or more nodes above it, and the indentations illustrate dependent relationships between and among the nodes. For example, the second node 206 is indented with respect to the first node 204, the third node 208 is indented with respect to the second node 206, and the fourth node 210 is indented with respect to the third node 208. This arrangement indicates that the value of the variable initialized at the line of the source code corresponding to the first node 204 (in this case the variable "z") depends on the value of the variable initialized at the line of the source code corresponding to the second node 206 (in this case the variable "x"), which in turn depends on the value of the variable initialized at the line of the source code corresponding to the third node 208 (in this case the variable "a"), which in turn depends on the value of the constant defined at the line of the source code corresponding to the fourth node 210 (in this case the constant "x86"), and the value of the variable "z" further depends on the value of the variable initialized at the line of the source code corresponding to the fifth node 212 (in this case the variable "y"), because the fifth node 212 is also indented with respect to the first node 204.

The indented arrangement of the nodes in the tree data structure 202 aids the user's comprehension of how the lines of source code lead to an error by providing visual indicators of the dependent relationships between and among the nodes, and in turn between and among the variables and constants initialized and defined at the lines of the source code that correspond to each node. Thus, even though the error in Code Snippet A occurs at Class1.java: line 6, the user very quickly comprehends, from the arrangement of the tree data structure 202, that the value of the variable asserted at Class1.java: line 6 (corresponding to the sixth node 214) relates back to Class1.java: line 5 (corresponding to the first node 204), which relates back to Class1.java: lines 3 and 4 (corresponding to the second and fifth nodes 206, 212), and Class1.java: line 3 relates back to Class1.java: line 2 (corresponding to the third node 208), which relates back to Class2.java: line 8 (corresponding to the fourth node 210).

As illustrated in FIG. 2, some of the variables and constants in Code Snippet A have nested dependencies, meaning that a value of a given variable depends not only on the value of another variable, but also on the value(s) of one or more still further variable(s) on which the value of the another variable depends. Thus, for example, a value of a first variable may depend on a value of a second variable, where the value of the second variable depends on a value of a third variable, the value of the third variable depends on a value of a fourth variable, and so on. In this example, the value of the first variable depends not only on the value of the second variable, but also on the values of the third and fourth variables, which are nested within the second variable.

The tree data structure 202 illustrates nested dependencies with varying amounts or degrees of indentation for nodes, where nodes at a same level of dependency have the same amount or degree of indentation. For example, the first node 204 has no indentation, and may be labeled as a Level 0 node, indicating that no other variables depend on the variable initialized at the location (e.g., line) in the source code corresponding to the first node 204. The second node 206 is indented by a first amount, and may be labeled as a Level 1 node, indicating that one other variable depends on the variable initialized at the location (e.g., line) in the source code corresponding to the second node 206. The third node 208 is indented by a second amount, which is greater than the first amount, and may be labeled as a Level 2 node, indicating that two other variables depend on the variable initialized at the location (e.g., line) in the source code corresponding to the third node 208. The fourth node 210 is indented by a third amount, which is greater than the second amount, and may be labeled as a Level 3 node, indicating that three other variables depend on the variable initialized at the location (e.g., line) in the source code corresponding to the fourth node 210. Like the second node 206, the fifth node 212 is indented by the first amount, and may also be labeled as a Level 1 node, because only one other variable depends on the variable initialized at the location (e.g., line) in the source code corresponding to the fifth node 212. And, like the first node 204, the sixth node 214 has no indentation, and may be labeled as a Level 0 node.

In some embodiments, at least some of the trace elements output from the computer program analysis tool 108 include annotations, and the annotations are represented in the tree data structure 202 adjacent their respective nodes. The annotations provide contextual information that helps the user understand the action(s) performed at the locations in the computer code 114 corresponding to the annotated nodes. In some instances, the annotations may further provide contextual information about usage of data types from other parts of the computer code 114 and operations performed on data types. For example, as illustrated in FIG. 2, the first node 204 includes a first annotation 224 with the text "z of type int is initialized." The first annotation 224 thus explains that at Class1.java: line 5 a variable "z" of type int is initialized. The second node 206 includes a second annotation 226 with the text "x of type int is initialized and length( ) called on a." The second annotation 226 thus explains that at Class1.java: line 3 a variable "x" of type int is initialized, and the operation length( ) is called to get the length of the variable "a." The third node 208 includes a third annotation 228 with the text "a of type string is initialized." The third annotation 228 thus explains that at Class1.java: line 2 a variable "a" of type string is initialized. The fourth node 210 includes a fourth annotation 230 with the text "constant "x86" of type string is defined." The fourth annotation 230 thus explains that at Class2.java: line 8 a constant "x86" of type string is defined. The fifth node 212 includes a fifth annotation 232 with the text "y of type int is initialized with value −4." The fifth annotation 232 thus explains that at Class1.java: line 4 a variable "y" of type int is initialized with value −4. The sixth node 214 includes a sixth annotation 234 with the text "potential assertion violation with value of z as −1." The sixth annotation 234 thus explains that at Class1.java: line 6 the assertion of the value of "z" may be invalid because the actual value of z is −1.

In the embodiment of FIG. 2, the annotations are enclosed within parentheses, and are presented in-line with (on the same line as) their corresponding nodes. The parenthetical form of the annotations helps to distinguish the annotations from the program type and line numbers provided at the corresponding nodes. However, in alternative embodiments, the annotations need not be enclosed within parentheses and/or need not be presented in-line with their corresponding nodes. The annotations may, for example, be presented in-line with their corresponding nodes and spaced from the program type and line numbers by a sufficient amount that the annotations are clearly distinguishable from the program type and line numbers. In alternative embodiments, the annotations may be presented just below their corresponding nodes. Other arrangements and presentations are, of course, possible, and contemplated to be within the scope of the present embodiments.

In some embodiments, the tree data structure 202 comprises color coding that distinguishes nodes at different levels of the tree data structure 202. For example, the first and sixth nodes 204, 214, which are both Level 0 nodes, may be presented using a first color, while the second and fifth nodes 206, 212, which are both Level 1 nodes, may be presented using a second color different from the first color. Similarly, the third node 208, which is a Level 2 node, may be presented using a third color different from both the first and second colors, and the fourth node 210, which is a Level 3 node, may be presented using a fourth color different from all of the first, second, and third colors. The colors in the tree data structure 202 may be in the form of colored text, or colored highlighting overlying text, or colored bullet points setting off the nodes, or in any other representation that uses different colors to indicate dependent relationships between and among nodes, while nodes at the same level may be represented with the same color.

With reference to FIG. 1, the data store 118 may include a correctness specification 120, and the computer program analysis tool 108 may check the computer code against the correctness specification 120. For example, the computer program analysis tool 108 may perform data analysis on the computer code, checking the computer code against the correctness specification 120 to ensure defined data is properly used. Defined data may be improperly used, for example, when a defined variable leads to an invalid assertion, such as the assertion that z>=0 at Class1.java: line 6 in Code Snippet A, when the actual value of z is −1. In another example, the computer program analysis tool 108 may check the computer code against defined coding rules from standards and/or against custom predefined rules or policies, any of which may be part of a set of rules/policies 122 in the correctness specification 120. For example, a custom predefined policy 122 in the correctness specification 120 may specify that credentials (e.g., usernames, passwords, and the like) are not to be hardcoded. If the computer program analysis tool 108 identifies a credential definition in the computer code, where the value of the credential is explicit in the code, the computer program analysis tool 108 may produce an output to the trace log 116 identifying this policy violation. In another example, a custom predefined policy 122 in the correctness specification 120 may specify that cryptographic ciphers are not to be hardcoded.

In various embodiments, the rules/policies 122 may be expressed in different ways. For example, one or more rules may capture different incorrect program properties that the computer program analysis tool 108 should flag. One way to express a rule is in the form of a finite state machine, where state transitions capture a sequence of operations in the computer program that could lead to an error state. For example, a state machine may have an initial state, a set of erroneous states, and other intermediate states. The state machine further has a set of transitions, where each transition is defined by a "from" state, a "to" state, and a predicate that, when true, causes the transition. The predicates capture various properties of the computer program, such as a call to a certain API, a call to the API with constant parameters from a set of literals, etc. Another way to express a rule is a set of pre-conditions and a set of post-conditions, both expressed in the form of predicates. The post-conditions, when violated, lead to a potential violation.

With reference to FIG. 1, the trace log 116 is transmitted, at circle "5," from the code analysis service 102 to the electronic device 104, via the network interface(s) and the intermediate network(s) 106. For example, when the computer program analysis tool 108 completes the analysis of the computer code, the output from the computer program analysis tool 108 may be transmitted to the electronic device 104. The trace log 116, which may be stored in local memory (not shown) at the electronic device 104 after being received from the code analysis service 102, may be used by the electronic device 104 to display, at circle "6," the tree data structure 202 (FIG. 2) on a display 124 of the electronic device 104. In some embodiments, the tree data structure 202 may be displayed in a web console (e.g., if the electronic device 104 is accessing the code analysis service 102 using a web browser), or in an integrated development environment (IDE) via a plug-in that connects to the code analysis service 102.

Figure 3:
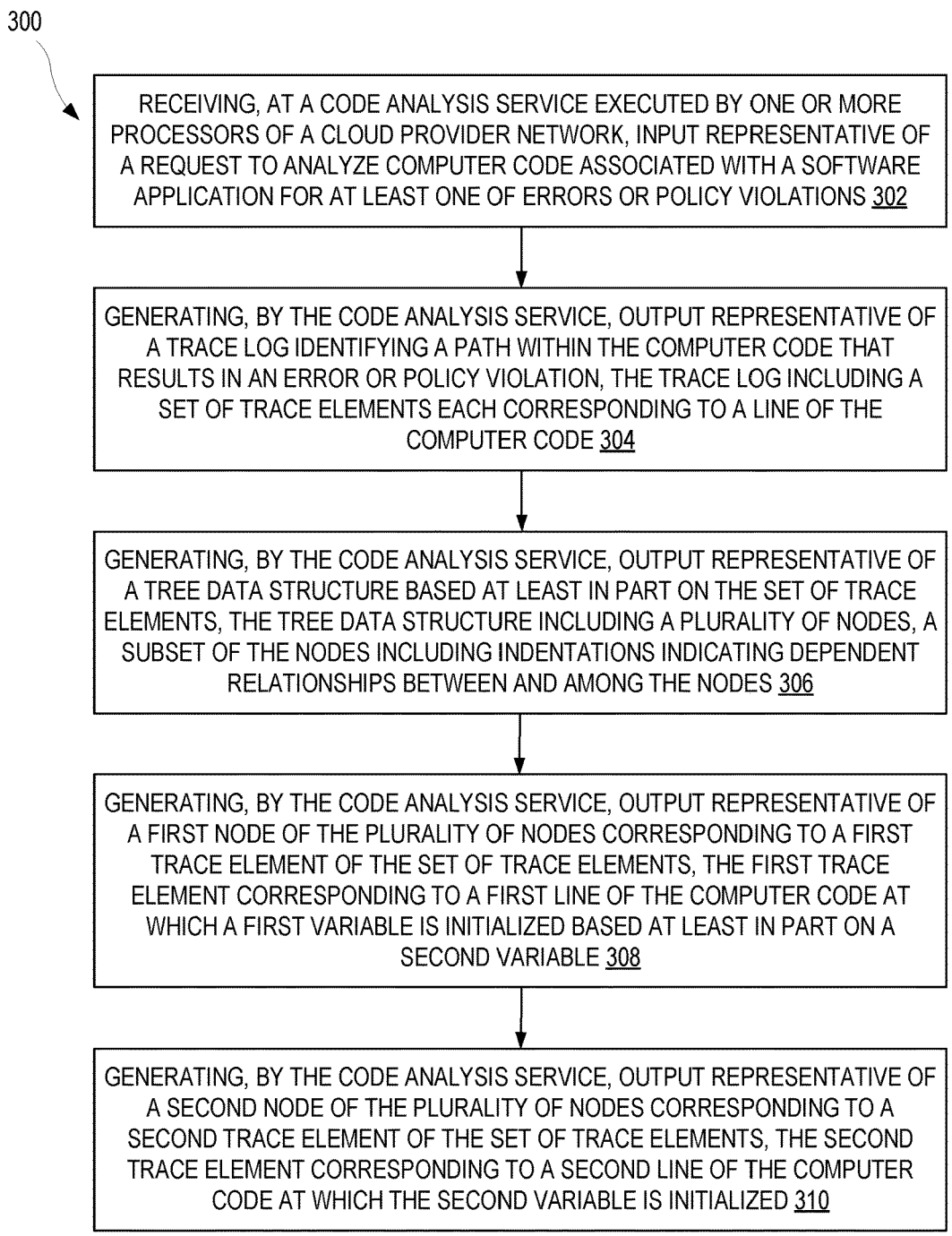
FIG. 3 is a flow diagram illustrating operations of a method for visualizing dependent relationships in computer program analysis trace elements according to some embodiments.

FIG. 3 is a flow diagram illustrating operations 300 of a method for visualizing dependent relationships in computer program analysis trace elements according to some embodiments. Some or all of the operations 300 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 300 are performed by the code analysis service 102 of the other figures. In some embodiments, one or more (or all) of the operations 300 are performed by the computer program analysis tool 108 of the other figures.

The operations 300 include, at block 302, receiving, at a code analysis service 102 executed by one or more processors of a cloud provider network 100, input representative of a request to analyze computer code associated with a software application for at least one of errors or policy violations. The request may, for example, be received from a user device via one or more intermediate networks 106. The computer code to be analyzed may also be received from the user device, and may be received together with the request, or may be received before or after the request.

The operations 300 further include, at block 304, generating, by the code analysis service 102 (e.g., by a computer program analysis tool 108), output representative of a trace log 116 identifying a path within the computer code that results in an error or policy violation. The trace log 116 includes a set of trace elements each corresponding to a line of the computer code. The process for identifying the path within the computer code that results in the error or policy violation may include tracing multiple paths within the computer code, such as all possible paths within the computer code. The process for identifying the path within the computer code that results in the error or policy violation may further include identifying, by the code analysis service 102 (e.g., by a computer program analysis tool 108), a first location (e.g., a first line) in the computer code at which a first variable is initialized based at least in part on a second variable, and a second location (e.g., as second line) in the computer code at which the second variable is initialized. The error in the computer code may comprise, for example, an invalid assertion for a value of the first variable.

The operations 300 further include, at block 306, generating, by the code analysis service 102 (e.g., by the computer program analysis tool 108), output representative of a tree data structure 202 based at least in part on the set of trace elements. The tree data structure 202 includes a plurality of nodes, and a subset of the nodes include indentations indicating dependent relationships between and among the nodes.

The operations 300 further include, at block 308, generating, by the code analysis service 102 (e.g., by the computer program analysis tool 108), output representative of a first node 204 of the plurality of nodes corresponding to a first trace element of the set of trace elements. The first trace element corresponds to a first line of the computer code at which the first variable is initialized based at least in part on the second variable.

The operations 300 further include, at block 310, generating, by the code analysis service 102 (e.g., by the computer program analysis tool 108), output representative of a second node 206 of the plurality of nodes corresponding to a second trace element of the set of trace elements. The second trace element corresponds to a second line of the computer code at which the second variable is initialized.

Subsequent to the operations above, a form of the output of the code analysis service 102 (e.g., of the computer program analysis tool 108) may be transmitted to an electronic device 104, and the tree data structure 202 may be displayed on a display 124 of the electronic device 104. In the displayed tree data structure 202, the second node 206 may be positioned beneath the first node 204, and the second node 206 may be indented with respect to the first node 204.

Another technical problem with traces produced according to prior techniques is their inability to alert the user to recurrent instances of the same error in different versions of the same computer code. For example, a user may write computer code, have the computer code analyzed by a computer program analysis tool, review results of the computer program analysis, and then revise the computer code to correct errors that were identified by the computer program analysis tool. The user, however, may fail to correct one of the errors. When the computer program analysis tool analyzes the revised computer code, the error that was not corrected will again appear in the output that's displayed to the user, but the output does not provide any indication that this error was also present in the previous version of the code. The user thus does not appreciate that the error is a recurrent error, and not a new error.

The present embodiments solve this technical problem by comparing different versions of the same computer code 114 to identify recurrent errors, and when recurrent errors are detected the output of the computer program analysis tool 108 provides an indication that an error has recurred. For example, consider the following simple code snippet (hereinafter Code Snippet B), which is a revised version of Code Snippet A:

//Class2.java
getA( ) {
line 12: return "x97";
}
//Class1.java
line 2: String a=getA( )//returns string constant "x97"
line 5: int x=a.length( )
line 6: int y=−7
line 8: z=x+y
line 10: assert (z>=0)

Figure 4:
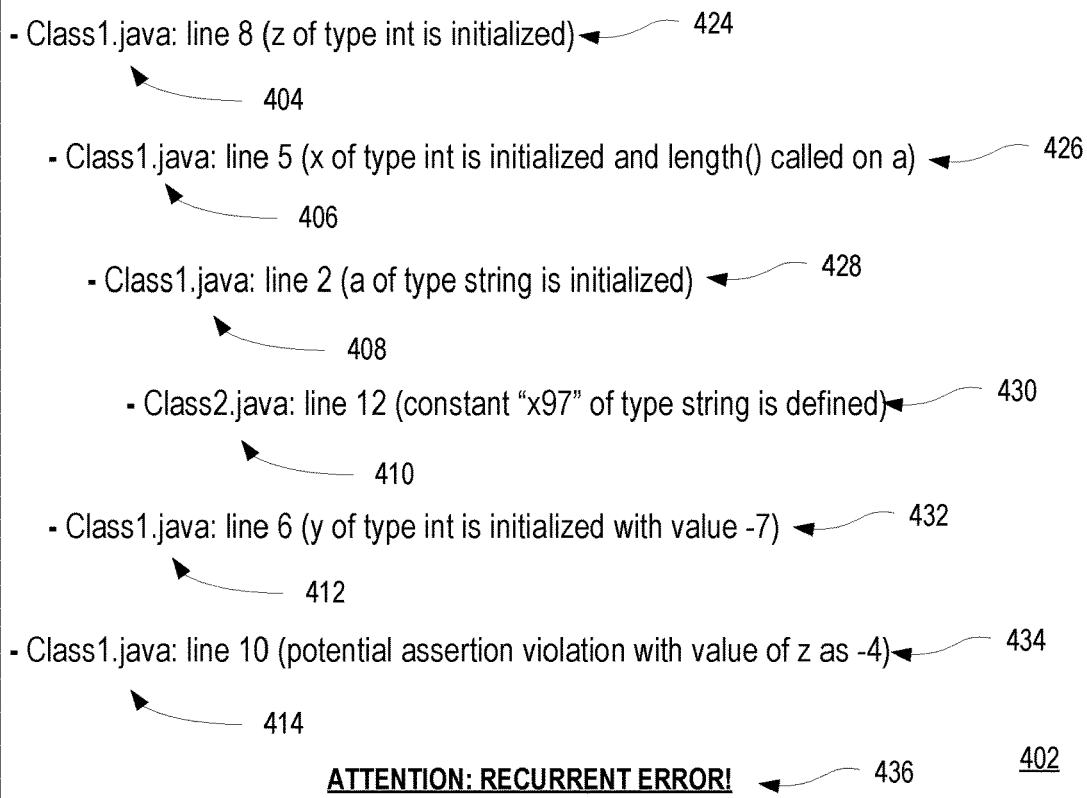
FIG. 4 is a diagram illustrating another output of a computer program analysis trace tool displayed as a tree data structure with annotations according to some embodiments.

Comparing Code Snippet B with Code Snippet A, both snippets reference the same variables and constants, but the values of some variables and constants differ between the two snippets, and several line numbers also differ. For example, in Class2.java of Code Snippet B, the value of the string constant has changed from "x86" to "x97," and the string constant is initialized at line 12 of Code Snippet B, whereas in Code Snippet A the string constant is initialized at line 8. In Class1.java of Code Snippet B, the value of the variable "y" has changed from "−4" to "−7," and the variable "y" is initialized at line 6 of Code Snippet B, whereas in Code Snippet A the variable "y" is initialized at line 4. In addition, the variable "x" is initialized at line 5 of Code Snippet B, whereas in Code Snippet A the variable "x" is initialized at line 3, the variable "z" is initialized at line 8 of Code Snippet B, whereas in Code Snippet A the variable "z" is initialized at line 5, and the variable "z" is asserted at line 10 of Code Snippet B, whereas in Code Snippet A the variable "z" is asserted at line 6. When the computer program analysis tool 108 according to the present embodiments analyzes Code Snippet B, the form of the tree data structure 202 will be the same as that produced by the analysis of Code Snippet A. The tree data structure 402 produced by the analysis of Code Snippet B is illustrated in FIG. 4. In this tree data structure 402, the annotations at the fourth, fifth, and sixth nodes 410, 412, 414 have changed to reflect the changed values of the string constant and the variable "y," but the form of the tree data structure 402 has not changed as compared to the tree data structure 202 shown in FIG. 2, because it includes the same indentation pattern with the same variables and constants appearing at corresponding levels of the two tree data structures 202, 402, even though some line numbers differ as between Code Snippets A and B. The present embodiments are able to compare tree data structures across different versions of the same code and, when matching tree data structures are found because an error in a previous version of the code was not corrected, the computer program analysis tool 108 provides an indication of the recurring error to the user.

Figure 5:
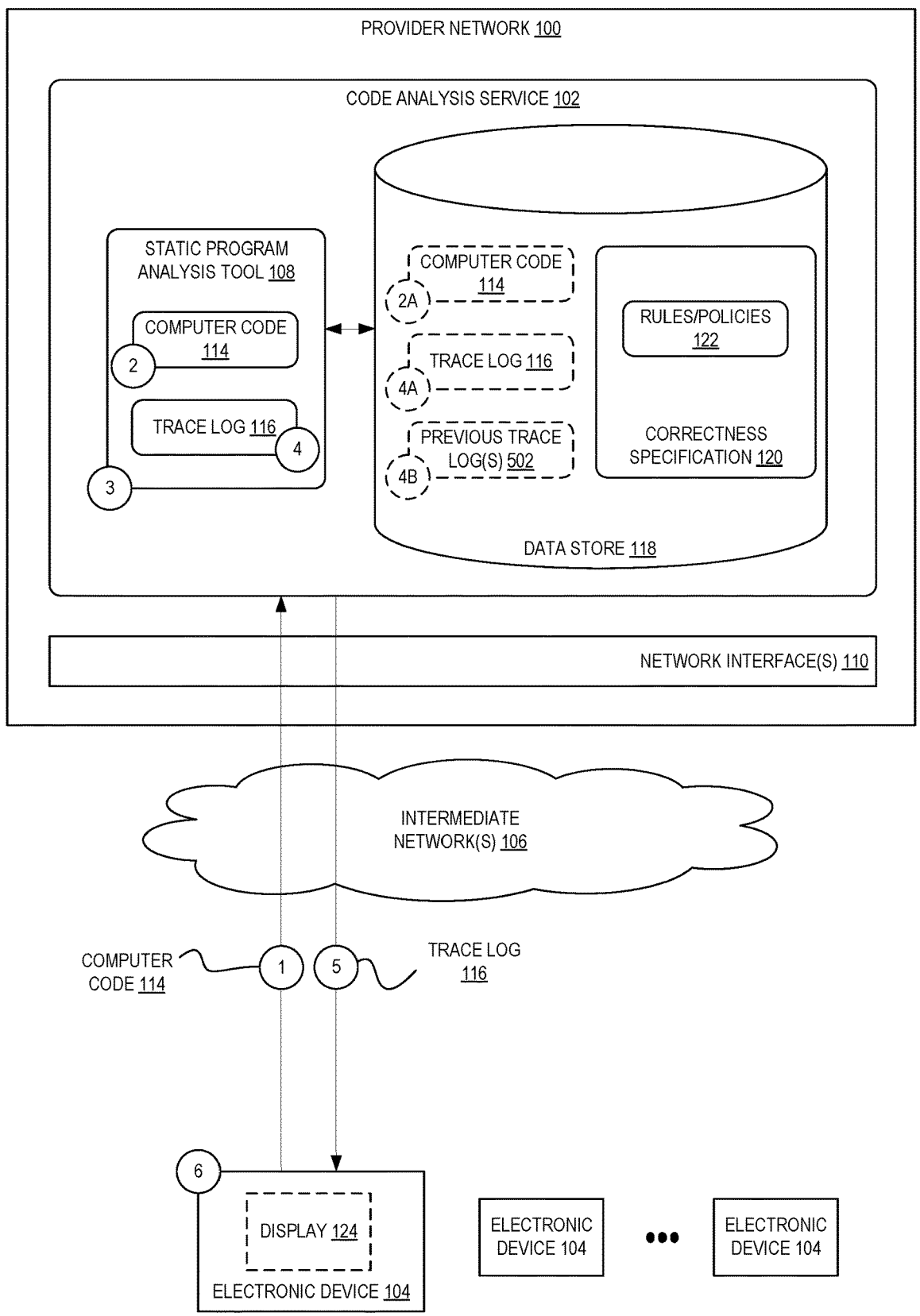
FIG. 5 is a diagram illustrating another environment for computer program analysis according to some embodiments.

For example, with reference to FIG. 5, previous trace logs 502 for previous versions of computer code 114 may be stored, at circle "4B," at the data store 118 of the code analysis service 102. When the computer program analysis tool 108 analyzes, at circle "3," a revised version of computer code 114, a comparison may be made between the tree data structure produced by the analysis of the revised version of the computer code 114 and the tree data structure(s) produced by any previous versions of the same computer code 114. The comparison may identify matching patterns of indentations, where the same variables and constants appear at corresponding levels of the tree data structures. When such a match is found, the computer program analysis tool 108 provides an indication of the recurring error to the user. For example, the computer program analysis tool 108 may output a text notation or warning 436 to accompany the displayed tree data structure 202. In the illustrated embodiment, the text notation 436 reads "ATTENTION: RECURRENT ERROR!" and is positioned beneath the tree data structure 402. However, in other embodiments the text notation 436 may use different words and/or may be located in a different location from the illustrated example.

Figure 6:
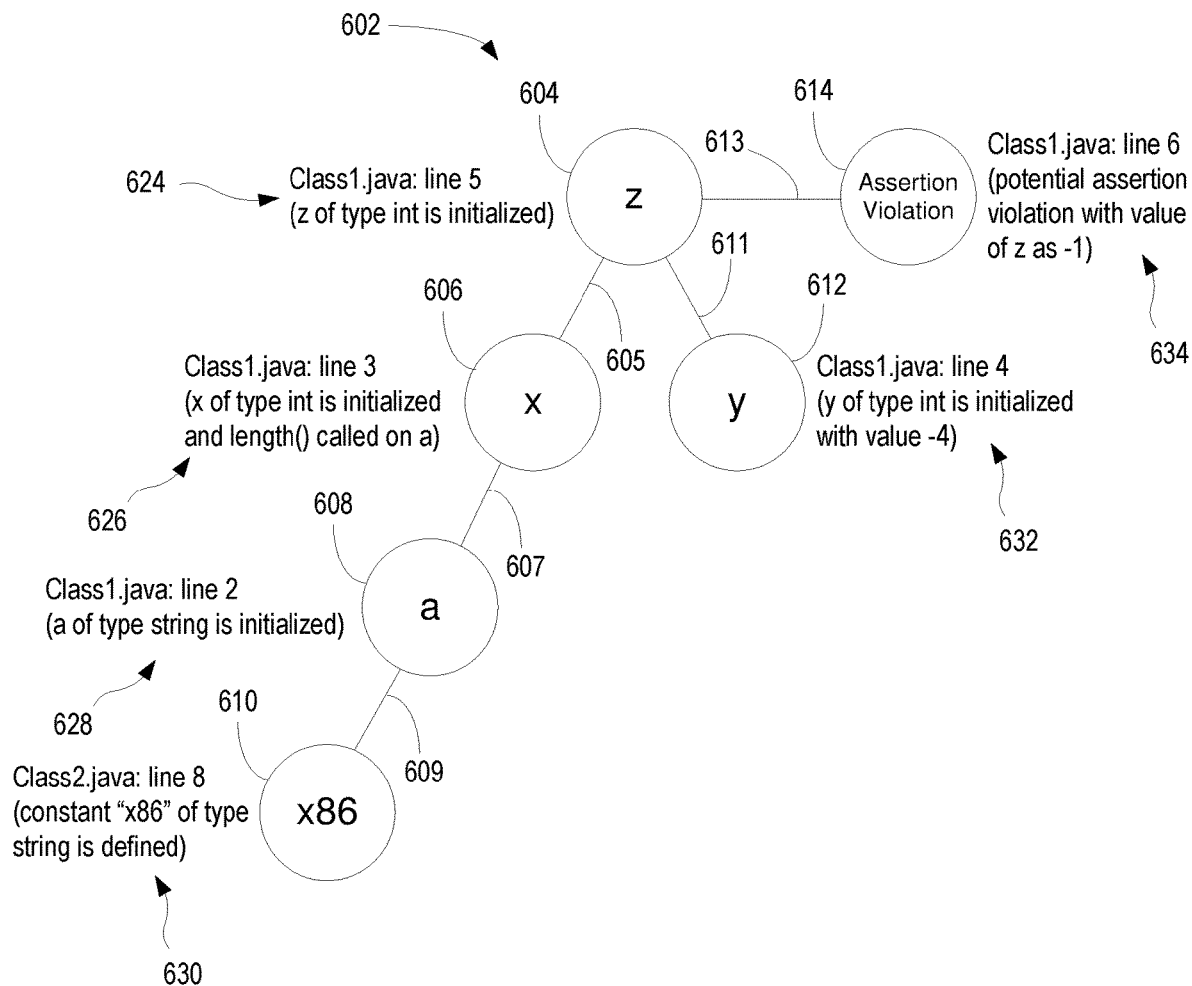
FIG. 6 is a diagram illustrating another output of a computer program analysis trace tool displayed as a tree data structure according to some embodiments.

FIG. 6 illustrates an alternative form of a tree data structure 602 according to some embodiments. The tree data structure 602 includes a plurality of nodes, each representing one of the trace elements. For example, in the embodiment illustrated in FIG. 6, a first node 604 represents the trace element corresponding to Class1.java: line 5, a second node 606 represents the trace element corresponding to Class1.java: line 3, a third node 608 represents the trace element corresponding to Class1.java: line 2, a fourth node 610 represents the trace element corresponding to Class2.java: line 8, a fifth node 612 represents the trace element corresponding to Class1.java: line 4, and a sixth node 614 represents the trace element corresponding to Class1.java: line 6.

The nodes are connected by edges, and are arranged to indicate parent-child relationships between and among the nodes. For example, the second node 606 is positioned beneath the first node 604 and connected thereto by a first edge 605, the third node 608 is positioned beneath the second node 606 and connected thereto by a second edge 607, the fourth node 610 is positioned beneath the third node 608 and connected thereto by a third edge 609, the fifth node 612 is positioned beneath the first node 604 at the same height or level within the tree data structure 602 as the second node 606, and connected to the first node 604 by a fourth edge 611, and the sixth node 614 is positioned beside the first node 604 at the same height or level within the tree data structure 602 as the first node 604, and connected to the first node 604 by a fifth edge 613. This arrangement indicates that the value of the variable initialized at the line of the source code corresponding to the first node 604 (in this case the variable "z") depends on the value of the variable initialized at the line of the source code corresponding to the second node 606 (in this case the variable "x"), which in turn depends on the value of the variable initialized at the line of the source code corresponding to the third node 608 (in this case the variable "a"), which in turn depends on the value of the constant defined at the line of the source code corresponding to the fourth node 610 (in this case the constant "x86"), and the value of the variable "z" further depends on the value of the variable initialized at the line of the source code corresponding to the fifth node 612 (in this case the variable "y").

The illustrated arrangement of the nodes in the tree data structure 602 aids the user's comprehension of how the lines of source code lead to an error by providing visual indicators of the dependent relationships between and among the nodes, and in turn between and among the variables and constants initialized and defined at the lines of the source code that correspond to each node. Thus, even though the error in Code Snippet A occurs at Class1.java: line 6, the user very quickly comprehends, from the arrangement of the tree data structure 602, that the value of the variable asserted at Class1.java: line 6 (corresponding to the sixth node 614) relates back to Class1.java: line 5 (corresponding to the first node 604), which relates back to Class1.java: lines 3 and 4 (corresponding to the second and fifth nodes 606, 612), and Class1.java: line 3 relates back to Class1.java: line 2 (corresponding to the third node 608), which relates back to Class2.java: line 8 (corresponding to the fourth node 610).

The tree data structure 602 illustrates nested dependencies with a hierarchical arrangement for the nodes, where nodes that have a dependent relationship are located at different heights or levels and connected, directly or indirectly, by one or more edges. For example, the first node 604 is located at the topmost height or level, with no other nodes positioned above it, indicating that no other variables depend on the variable initialized at the location (e.g., line) in the source code corresponding to the first node 604 (a Level 0 node). The second and fifth nodes 606, 612 (Level 1 nodes) are located one level below the first node 604, and connected thereto by the first edge 605 and the fourth edge 611, respectively, indicating that the value of the variable initialized at the location in the source code corresponding to the first node 604 depends on the values of the variables initialized at the locations in the source code corresponding to the second and fifth nodes 606, 612. The third node 608 (a Level 2 node) is located one level below the second node 606, and connected thereto by the second edge 607, indicating that the value of the variable initialized at the location in the source code corresponding to the second node 606 depends on the value of the variable initialized at the location in the source code corresponding to the third node 608. The fourth node 610 (a Level 3 node) is located one level below the third node 608, and connected thereto by the third edge 609, indicating that the value of the variable initialized at the location in the source code corresponding to the third node 608 depends on the value of the variable initialized at the location in the source code corresponding to the fourth node 610.

The tree data structure 602 illustrated in FIG. 6 further includes annotations adjacent the nodes. For example, the first node 604 includes a first annotation 624 with the text "z of type int is initialized." The first annotation 624 thus explains that at Class1.java: line 5 a variable "z" of type int is initialized. The second node 606 includes a second annotation 626 with the text "x of type int is initialized and length( ) called on a." The second annotation 626 thus explains that at Class1.java: line 3 a variable "x" of type int is initialized, and the operation length( ) is called to get the length of the variable "a." The third node 608 includes a third annotation 628 with the text "a of type string is initialized." The third annotation 628 thus explains that at Class1.java: line 2 a variable "a" of type string is initialized. The fourth node 610 includes a fourth annotation 630 with the text "constant "x86" of type string is defined." The fourth annotation 630 thus explains that at Class2.java: line 8 a constant "x86" of type string is defined. The fifth node 612 includes a fifth annotation 632 with the text "y of type int is initialized with value −4." The fifth annotation 632 thus explains that at Class1.java: line 4 a variable "y" of type int is initialized with value −4. The sixth node 614 includes a sixth annotation 634 with the text "potential assertion violation with value of z as −1." The sixth annotation 634 thus explains that at Class1.java: line 6 the assertion of the value of "z" may be invalid because the actual value of z is −1.

In some embodiments, the annotations shown in FIG. 6 may be hidden and only appear in response to an input. For example, a user may view the tree data structure 602 represented as a GUI (graphical user interface) on the display 124 of the electronic device (FIG. 1), where at least some of the nodes and/or edges may be selected (e.g., by tapping or clicking). When a node or edge is selected, its respective annotation(s) may appear in the GUI. Alternatively, or in addition, selecting a node or edge may redirect the user to the exact line(s) of code corresponding to the selected node or edge.

The tree data structure 602 illustrated in FIG. 6 further includes text within each node that provides further information about what each node represents. For example, the first node 604 contains a "z," indicating that the first node 604 represents the location in the source code where the variable "z" is initialized. Similarly, the second node 606, the third node 608, the fourth node 610, and the fifth node 612 each contain, respectively, an "x," an "a," and an "x86," indicating that each of those nodes represents the location in the source code where each respective variable or constant is initialized. The sixth node 614 contains the text "Assertion Violation," indicating that the value of the variable asserted at the corresponding location in the source code is potentially invalid.

In some embodiments, the tree data structure 602 comprises color coding that distinguishes nodes at different levels of the tree data structure 602. For example, the first and sixth nodes 604, 614, which are both Level 0 nodes, may be presented using a first color, while the second and fifth node 606, 612, which are both Level 1 nodes, may be presented using a second color different from the first color. Similarly, the third node 608, which is a Level 2 node, may be presented using a third color different from both the first and second colors, and the fourth node 610, which is a Level 3 node, may be presented using a fourth color different from all of the first, second, and third colors.

Traces produced from a computer program analysis tool may have an erroneous sink for a bug, and the computer program analysis tool may produce different traces that have the same sink. For example, two errors in the computer code may have intermediate sequences of steps along different code paths, but trigger the bug at the same sink. Some of the present embodiments advantageously group these traces together. For example, if multiple traces have intermediate steps on the same type, and have an erroneous sink, the traces are grouped together when displayed to the user. Further, the user is presented a view for these paths in the code, where branch conditions for the code path in each trace are highlighted. In an example, two bugs along different program paths are triggered at the same location in the computer code. The computer program analysis tool 108 generates an on-demand detailed view for the grouped traces for the multiple bugs, where the branch sequence and path conditions for each are highlighted. For example, the first violation at line 25 due to branches: if (a>0) at line 10; if (b<0) at line 22. Path condition at line 25: (a>0 && b<0). Second violation at line 25 due to branches: if (a>0) at line 10; if (b>=0) at line 24. Path condition at line 25: (a>0 && b>=0). Grouping traces in this manner enables the user to better understand relationships between traces that otherwise might seem unrelated. The detailed view explains each trace clearly with path information, further aiding the user's understanding.

Figure 7:
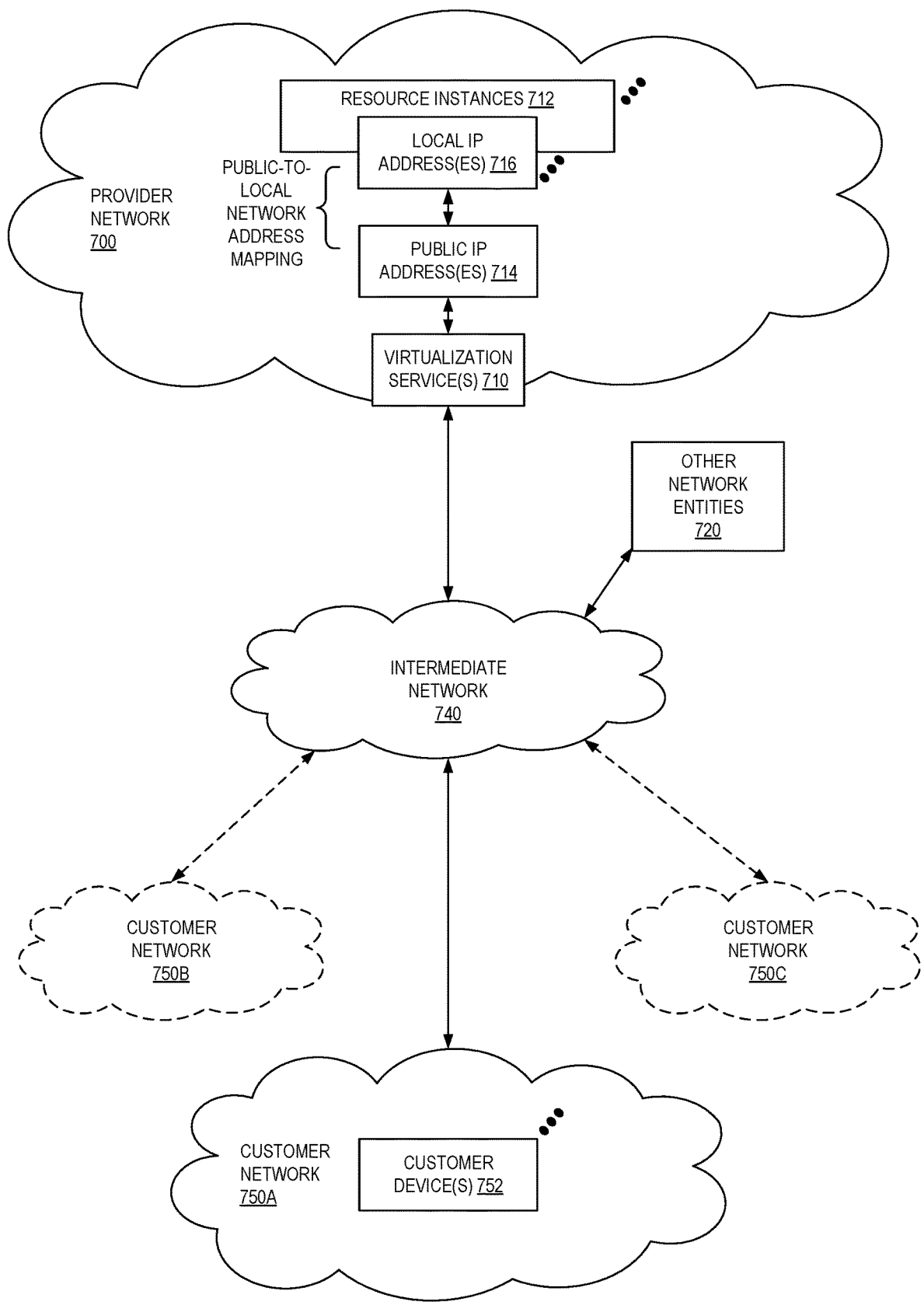
FIG. 7 illustrates an example provider network environment according to some embodiments.

FIG. 7 illustrates an example provider network (or service provider system) environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more customer networks 750A-750C (may also be referred to as client networks) including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or private network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
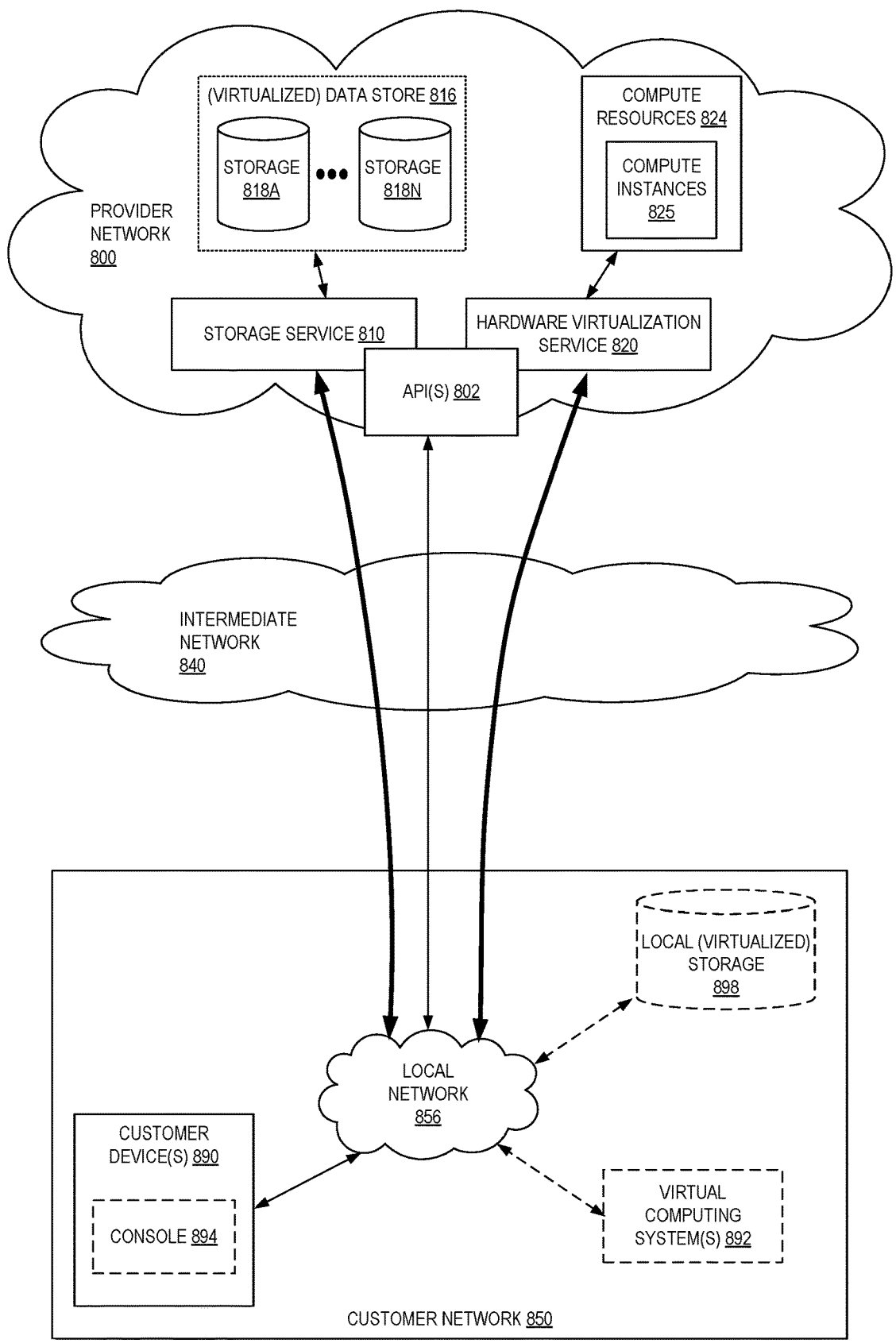
FIG. 8 is a block diagram of an example provider network that provides a storage service and a hardware virtualization service to customers according to some embodiments.

FIG. 8 is a block diagram of an example provider network environment that provides a storage service and a hardware virtualization service to customers, according to some embodiments. A hardware virtualization service 820 provides multiple compute resources 824 (e.g., compute instances 825, such as VMs) to customers. The compute resources 824 may, for example, be rented or leased to customers of a provider network 800 (e.g., to a customer that implements a customer network 850). Each computation resource 824 may be provided with one or more local IP addresses. The provider network 800 may be configured to route packets from the local IP addresses of the compute resources 824 to public Internet destinations, and from public Internet sources to the local IP addresses of the compute resources 824.

The provider network 800 may provide the customer network 850, for example coupled to an intermediate network 840 via a local network 856, the ability to implement virtual computing systems 892 via the hardware virtualization service 820 coupled to the intermediate network 840 and to the provider network 800. In some embodiments, the hardware virtualization service 820 may provide one or more APIs 802, for example a web services interface, via which the customer network 850 may access functionality provided by the hardware virtualization service 820, for example via a console 894 (e.g., a web-based application, standalone application, mobile application, etc.) of a customer device 890. In some embodiments, at the provider network 800, each virtual computing system 892 at the customer network 850 may correspond to a computation resource 824 that is leased, rented, or otherwise provided to the customer network 850.

From an instance of the virtual computing system(s) 892 and/or another customer device 890 (e.g., via console 894), the customer may access the functionality of a storage service 810, for example via the one or more APIs 802, to access data from and store data to storage resources 818A-818N of a virtual data store 816 (e.g., a folder or bucket, a virtualized volume, a database, etc.) provided by the provider network 800. In some embodiments, a virtualized data store gateway (not shown) may be provided at the customer network 850 that may locally cache at least some data, for example frequently accessed or critical data, and that may communicate with the storage service 810 via one or more communications channels to upload new or modified data from a local cache so that the primary store of data (the virtualized data store 816) is maintained. In some embodiments, a user, via the virtual computing system 892 and/or another customer device 890, may mount and access virtual data store 816 volumes via the storage service 810 acting as a storage virtualization service, and these volumes may appear to the user as local (virtualized) storage 898.

While not shown in FIG. 8, the virtualization service(s) may also be accessed from resource instances within the provider network 800 via the API(s) 802. For example, a customer, appliance service provider, or other entity may access a virtualization service from within a respective virtual network on the provider network 800 via the API(s) 802 to request allocation of one or more resource instances within the virtual network or within another virtual network.

Illustrative Systems

Figure 9:
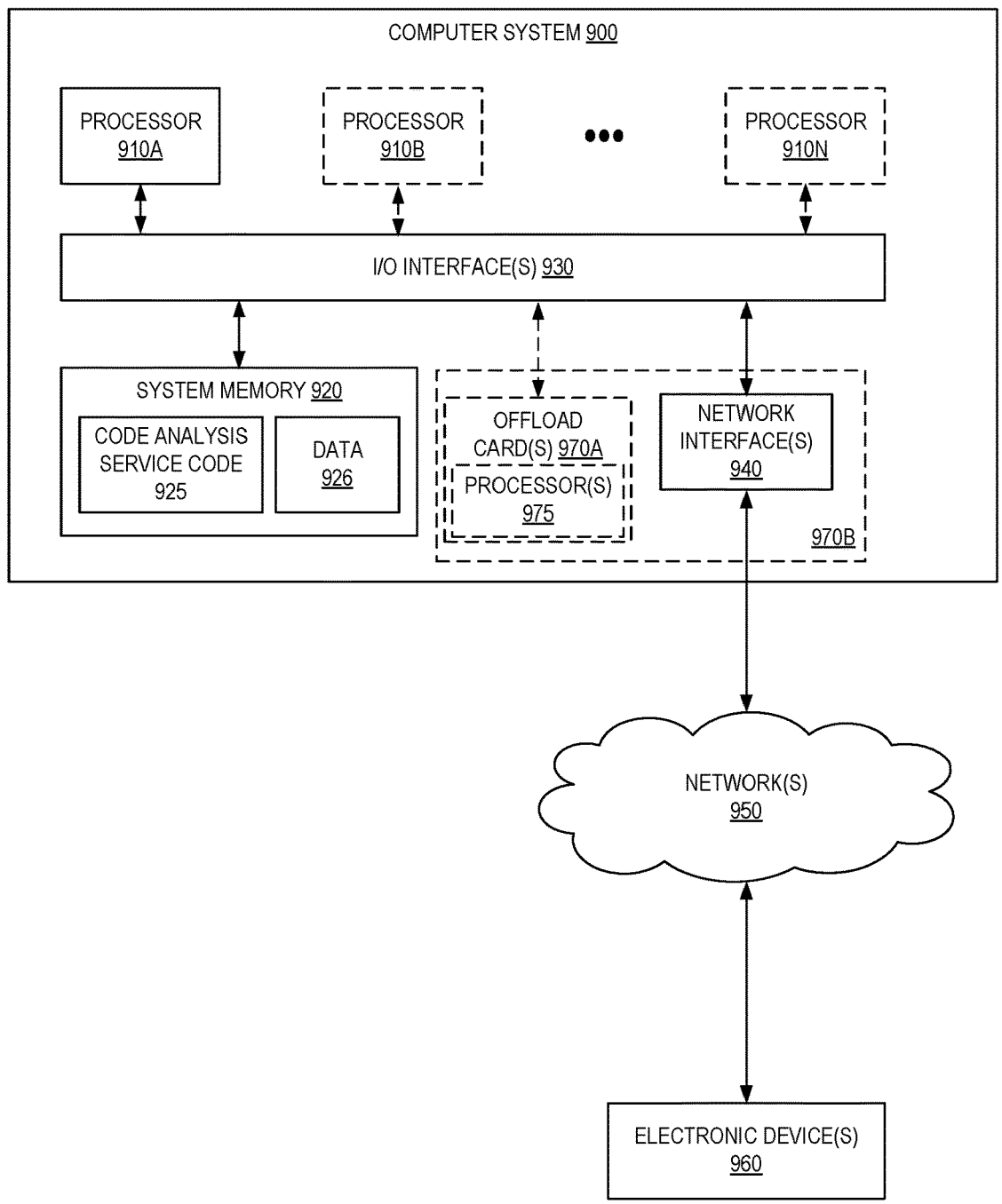
FIG. 9 is a block diagram illustrating an example computer system that may be used in some embodiments.

In some embodiments, a system that implements a portion or all of the techniques described herein may include a general-purpose computer system, such as the computer system 900 illustrated in FIG. 9, that includes, or is configured to access, one or more computer-accessible media. In the illustrated embodiment, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various embodiments the computer system 900 may include one computing device or any number of computing devices configured to work together as a single computer system 900.

In various embodiments, the computer system 900 may be a uniprocessor system including one processor 910, or a multiprocessor system including several processors 910 (e.g., two, four, eight, or another suitable number). The processor(s) 910 may be any suitable processor(s) capable of executing instructions. For example, in various embodiments, the processor(s) 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 may commonly, but not necessarily, implement the same ISA.

System memory 920 may store instructions and data accessible by the processor(s) 910. In various embodiments, the system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 920 as code analysis service code 925 (e.g., executable to implement, in whole or in part, the code analysis service 102) and data 926.

In one embodiment, the I/O interface 930 may be configured to coordinate I/O traffic between the processor 910, the system memory 920, and any peripheral devices in the device, including the network interface 940 and/or other peripheral interfaces (not shown). In some embodiments, the I/O interface 930 may perform any necessary protocol, timing, or other data transformations to convert data signals from one component (e.g., the system memory 920) into a format suitable for use by another component (e.g., the processor 910). In some embodiments, the I/O interface 930 may include support for devices attached through various types of peripheral buses, such as a variant of the Peripheral Component Interconnect (PCI) bus standard or the Universal Serial Bus (USB) standard, for example. In some embodiments, the function of the I/O interface 930 may be split into two or more separate components, such as a north bridge and a south bridge, for example. Also, in some embodiments, some or all of the functionality of the I/O interface 930, such as an interface to the system memory 920, may be incorporated directly into the processor 910.

The network interface 940 may be configured to allow data to be exchanged between the computer system 900 and other devices 960 attached to a network or networks 950, such as other computer systems or devices as illustrated in FIG. 1, for example. In various embodiments, the network interface 940 may support communication via any suitable wired or wireless general data networks, such as types of Ethernet network, for example. Additionally, the network interface 940 may support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations, such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, the system memory 920 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include any non-transitory storage media or memory media such as magnetic or optical media, e.g., disk or DVD/CD coupled to the computer system 900 via the I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of the computer system 900 as the system memory 920 or another type of memory. Further, a computer-accessible medium may include transmission media or signals such as electrical, electromagnetic, or digital signals, conveyed via a communication medium such as a network and/or a wireless link, such as may be implemented via the network interface 940.

Figure 10:
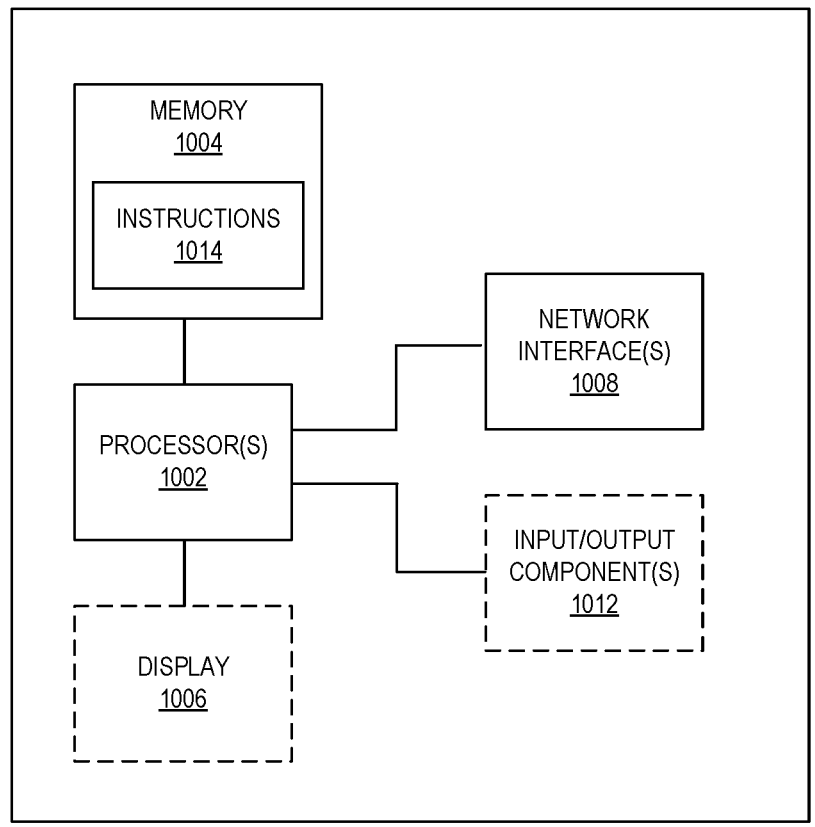
FIG. 10 illustrates a logical arrangement of a set of general components of an example computing device that can be used in accordance with various embodiments.

FIG. 10 illustrates a logical arrangement of a set of general components of an example computing device 1000, such as the electronic device 104, etc. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (e.g., instructions 1014) and/or data, and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1014) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and use a microphone, camera, sensor, etc., such that a user can control the device without having to be in physical contact with the device.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., NoSQL), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method, comprising:
   receiving, at a code analysis service executed by one or more processors of a cloud provider network, input representative of source code associated with a software application;
   receiving, at the code analysis service, input representative of a request to analyze the source code for at least one of errors or policy violations;
   tracing, by a computer program analysis tool of the code analysis service executed by the one or more processors, multiple paths within the source code;
   identifying, by the computer program analysis tool, a first path of the multiple paths within the source code that results in an invalid assertion for a value of a first variable;
   identifying, by the computer program analysis tool, a first location in the source code at which the first variable is initialized;
   identifying, by the computer program analysis tool, a second location in the source code at which a second variable is initialized, wherein the value of the first variable depends at least in part upon a value of the second variable;
   generating, by the computer program analysis tool, output representative of a trace log of the source code, the trace log including a set of trace elements each corresponding to a line of the source code;
   generating a tree data structure based on the set of trace elements, the tree data structure including:
      a first node corresponding to a first trace element of the set of trace elements, the first trace element corresponding to a first line of the source code at which the first variable is initialized based at least in part on the second variable; and
      a second node corresponding to a second trace element of the set of trace elements, wherein the second node is a child node of the first node, and the second trace element corresponds to a second line of the source code at which the second variable is initialized; and
   causing display of a representation of at least a portion of the tree data structure in which:
      the second node is positioned beneath the first node; and
      the second node is indented with respect to the first node.

2. The computer-implemented method of claim 1, further comprising:
   identifying, by the computer program analysis tool, a third location in the source code at which a constant is defined, wherein the value of the second variable depends at least in part upon a value of the constant;
   generating the tree data structure based on the set of trace elements, the tree data structure further including a third node corresponding to a third trace element of the set of trace elements, the third trace element corresponding to a third line of the source code at which the constant is defined; and
   causing further display of the representation of at least a portion of the tree data structure in which:
      the third node is positioned beneath the second node; and
      the third node is indented with respect to the second node.

3. The computer-implemented method of claim 1, further comprising:
   generating, by the computer program analysis tool, further output representative of the trace log of the source code, the trace log further including:
   a first annotation corresponding to the first trace element, the first annotation indicating that the first variable is initialized at the first line of the source code; and
   a second annotation corresponding to the second trace element, the second annotation indicating that the second variable is initialized at the second line of the source code.

4. A computer-implemented method comprising:
receiving, at a code analysis service executed by one or more processors of a cloud provider network, input representative of a request to analyze computer code associated with a software application for at least one of errors or policy violations;
generating, by the code analysis service, output representative of a trace log identifying a path within the computer code that results in an error or policy violation, the trace log including a set of trace elements each corresponding to a line of the computer code; and
generating, by the code analysis service, output representative of a tree data structure based at least in part on the set of trace elements, the tree data structure including a plurality of nodes, the nodes including:
a first node of the plurality of nodes corresponding to a first trace element of the set of trace elements, the first trace element corresponding to a first line of the computer code at which a first variable is initialized, wherein a value of the first variable depends at least in part on a value of a second variable; and
a second node of the plurality of nodes corresponding to a second trace element of the set of trace elements, wherein the second node is a child node of the first node, the second trace element corresponding to a second line of the computer code at which the second variable is initialized; and
causing display of a representation of at least a portion of the tree data structure in which the second node is positioned beneath the first node and is indented with respect to the first node, thereby indicating that the value of the first variable depends at least in part on the value of the second variable.

5. The computer-implemented method of claim 4, wherein a subset of the nodes include indentations indicating dependent relationships between and among the nodes.

6. The computer-implemented method of claim 4, wherein the output representative of the tree data structure is configured such that, when a representation of at least a portion of the tree data structure is displayed, the second node is positioned beneath the first node, and the second node is indented with respect to the first node.

7. The computer-implemented method of claim 4, wherein the output representative of the tree data structure is configured such that, when a representation of at least a portion of the tree data structure is displayed, the second node is positioned beneath the first node, and the second node is connected to the first node via a first edge.

8. The computer-implemented method of claim 4, wherein the nodes further include a third node corresponding to a third trace element of the set of trace elements, the third trace element corresponding to a third line of the computer code at which a constant is defined, wherein a value of the second variable depends at least in part upon a value of the constant.

9. The computer-implemented method of claim 8, wherein the output representative of the tree data structure is configured such that, when a representation of at least a portion of the tree data structure is displayed, the third node is positioned beneath the second node, and the third node is indented with respect to the second node.

10. The computer-implemented method of claim 4, further comprising:
generating, by the code analysis service, further output representative of the trace log of the computer code, the trace log further including:
a first annotation corresponding to the first trace element, the first annotation indicating that the first variable is initialized at the first line of the computer code; and
a second annotation corresponding to the second trace element, the second annotation indicating that the second variable is initialized at the second line of the computer code.

11. The computer-implemented method of claim 10, wherein the first annotation further indicates a type of the first variable.

12. The computer-implemented method of claim 4, further comprising:
receiving, at the code analysis service, further input representative of another request to analyze revised computer code associated with the software application for at least one of errors or policy violations;
generating, by the code analysis service, output representative of another trace log identifying a path within the revised computer code that results in an error or policy violation, the another trace log including another set of trace elements each corresponding to a line of the revised computer code;
generating, by the code analysis service, output representative of another tree data structure based at least in part on the another set of trace elements, the another tree data structure including another plurality of nodes;
comparing, by the code analysis service, the tree data structure and the another tree data structure; and
generating, by the code analysis service, output representative of a warning that an error in the revised computer code is a recurrent error.

13. The computer-implemented method of claim 4, wherein the tree data structure comprises color coding that distinguishes nodes of the plurality of nodes that are at different levels of the tree data structure.

14. The computer-implemented method of claim 13, wherein the first node comprises a first color, and the second node comprises a second color different from the first color.

15. A system comprising:
one or more electronic devices to implement a code analysis service in a multi-tenant provider network, the code analysis service including instructions that, upon execution by one or more processors, cause the code analysis service to:
receive input representative of a request to analyze computer code associated with a software application for at least one of errors or policy violations;
generate output representative of a trace log identifying a path within the computer code that results in an error or policy violation, the trace log including a set of trace elements each corresponding to a line of the computer code; and
generate output representative of a tree data structure based at least in part on the set of trace elements, the tree data structure including a plurality of nodes, the nodes including:
a first node of the plurality of nodes corresponding to a first trace element of the set of trace elements, the first trace element corresponding to a first line of the computer code at which a first variable is initialized, wherein a value of the first variable depends at least in part on a value of a second variable; and
a second node of the plurality of nodes corresponding to a second trace element of the set of trace elements, wherein the second node is a child node of the first node, the second trace element corresponding to a second line of the computer code at which the second variable is initialized; and cause display of a representation of at least a portion of the tree data structure in which the second node is positioned beneath the first node and is indented with respect to the first node, thereby indicating that the value of the first variable depends at least in part on the value of the second variable.

16. The system of claim 15, wherein a subset of the nodes include indentations indicating dependent relationships between and among the nodes.

17. The system of claim 15, wherein the output representative of the tree data structure is configured such that, when a representation of at least a portion of the tree data structure is displayed, the second node is positioned beneath the first node, and the second node is indented with respect to the first node.

18. The system of claim 15, the code analysis service including further instructions that, upon execution by one or more processors, further cause the code analysis service to:
   generate further output representative of the trace log of the computer code, the trace log further including:
      a first annotation corresponding to the first trace element, the first annotation indicating that the first variable is initialized at the first line of the computer code; and
      a second annotation corresponding to the second trace element, the second annotation indicating that the second variable is initialized at the second line of the computer code.

19. The system of claim 18, wherein the first annotation further indicates a type of the first variable.

20. The system of claim 15, wherein the tree data structure comprises color coding that distinguishes nodes of the plurality of nodes that are at different levels of the tree data structure.

* * * * *